(12) United States Patent
Okimoto et al.

(10) Patent No.: US 12,142,773 B2
(45) Date of Patent: Nov. 12, 2024

(54) GASKET AND CYLINDRICAL BATTERY

(71) Applicant: SANYO Electric Co., Ltd., Daito (JP)

(72) Inventors: Ryota Okimoto, Osaka (JP); Oose Okutani, Hyogo (JP); Shin Haraguchi, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 622 days.

(21) Appl. No.: 17/417,255

(22) PCT Filed: Dec. 11, 2019

(86) PCT No.: PCT/JP2019/048469
§ 371 (c)(1),
(2) Date: Jun. 22, 2021

(87) PCT Pub. No.: WO2020/137547
PCT Pub. Date: Jul. 2, 2020

(65) Prior Publication Data
US 2022/0069392 A1 Mar. 3, 2022

(30) Foreign Application Priority Data
Dec. 28, 2018 (JP) ................. 2018-247177

(51) Int. Cl.
*H01M 50/107* (2021.01)
*H01M 10/0587* (2010.01)
(Continued)

(52) U.S. Cl.
CPC ..... *H01M 50/107* (2021.01); *H01M 10/0587* (2013.01); *H01M 50/152* (2021.01); *H01M 50/184* (2021.01); *H01M 50/186* (2021.01)

(58) Field of Classification Search
None
See application file for complete search history.

(56) References Cited

U.S. PATENT DOCUMENTS

| | | | |
|---|---|---|---|
| 2007/0015046 A1 | 1/2007 | Kim et al. | |
| 2018/0309096 A1 | 10/2018 | Kim et al. | |
| 2023/0249288 A1* | 8/2023 | Ko | H01M 50/574 429/174 |

FOREIGN PATENT DOCUMENTS

| | | |
|---|---|---|
| JP | H06-251758 A | 9/1994 |
| JP | H09-320562 A | 12/1997 |

(Continued)

OTHER PUBLICATIONS

JP2007027103A English translation (Year: 2007).*

(Continued)

*Primary Examiner* — Lucas J. O'Donnell
(74) *Attorney, Agent, or Firm* — WHDA, LLP

(57) ABSTRACT

A gasket of a cylindrical battery according to an embodiment of the present disclosure comprises a cylindrical part, and a ring part which extends from one end part of the cylindrical part in the axial direction toward an inner side thereof in the radial direction. A surface of the ring part which is opposite the cylindrical part side in the axial direction has, an approximately flat surface, A protrusion is provided on the side of the ring part which is toward the cylindrical part in the axial direction. Said protrusion: is positioned with gaps in the radial direction in relation to both the cylindrical part and an inner end of the ring part in the radial direction; and protrudes in the axial direction.

6 Claims, 9 Drawing Sheets

(51) Int. Cl.
*H01M 50/152* (2021.01)
*H01M 50/184* (2021.01)
*H01M 50/186* (2021.01)

(56) References Cited

FOREIGN PATENT DOCUMENTS

| | | | |
|---|---|---|---|
| JP | 2000-277063 | A | 10/2000 |
| JP | 2000-357495 | A | 12/2000 |
| JP | 2007-027103 | A | 2/2007 |
| JP | 2010-282824 | A | 12/2010 |
| JP | 5669369 | B2 | 2/2015 |

OTHER PUBLICATIONS

English Translation of International Search Report dated Mar. 3, 2020, issued in counterpart Application No. PCT/JP2019/048469. (3 pages).

* cited by examiner

GASKET AND CYLINDRICAL BATTERY

TECHNICAL FIELD

The present disclosure relates to a gasket of a cylindrical battery, and a cylindrical battery.

BACKGROUND ART

Conventionally, there is a cylindrical battery described in PATENT LITERATURE 1 as a cylindrical battery. This cylindrical battery comprises an electrode assembly in which a positive electrode and a negative electrode are wound via a separator, an electrolyte, a bottomed cylindrical exterior can that houses the electrode assembly and the electrolyte, a sealing assembly, and an annular gasket interposed between the exterior can and the sealing assembly.

The exterior can has a projecting portion that projects radially inward on an inner circumferential side by providing a groove extending in the circumferential direction on an outer circumferential surface. An end of the exterior can on the opening side is bent to the inner side to be caulked on the sealing assembly, so that the sealing assembly is held by the projecting portion and a caulked portion of the exterior can via the gasket, and is fixed to the exterior can. A positive electrode lead extending from the positive electrode of the electrode assembly is connected to a bottom surface of the sealing assembly by welding. The gasket has a cylindrical covering portion that extends in the axial direction to cover a part of the projecting portion.

CITATION LIST

Patent Literature

PATENT LITERATURE 1: Japanese Unexamined Patent Application Publication No. Hei 9-320562

SUMMARY

Technical Problem

In the conventional cylindrical battery, a part of a radially inner side of the projecting portion can be covered with the covering portion of the gasket, and therefore it is possible to reliably prevent a short circuit between the exterior can serving as a negative electrode terminal, and the positive electrode lead. However, the following problem exists. That is, when the cylindrical battery is manufactured, there are a method of mounting the gasket on the sealing assembly, and thereafter fitting the mounted gasket into the exterior can, and a method of fitting the gasket into the exterior can, and thereafter fitting an integrated structure of the electrode assembly and the sealing assembly integrated through the positive electrode lead into the exterior can. In such a background, in the former method, the cylindrical covering portion of the gasket covers a welding surface of the positive electrode lead in the sealing assembly, and therefore the covering portion becomes an obstacle, and it is hard to weld the positive electrode lead to the sealing assembly. In the latter method, at the time of battery assembly, two fitting works need to be performed, and therefore workability is likely to lower, and furthermore, a short circuit between the sealing assembly uncovered with the gasket and the exterior can is likely to occur.

Therefore, it is an advantage of the present disclosure to provide a gasket and a cylindrical battery in which it is possible to suppress a short circuit between a lead portion electrically connecting an electrode assembly to a sealing assembly, and an exterior can, and improve workability at the time of assembly.

Solution to Problem

In order to solve the above problem, a gasket according to the present disclosure is a gasket of a cylindrical battery that comprises: a cylindrical portion; and an annular portion that extends inward in a radial direction from one end of the cylindrical portion in the axial direction, wherein a surface of the annular portion on a side opposite to the cylindrical portion in the axial direction is a substantially flat surface, and a projection that is disposed at an interval in the radial direction from each of the cylindrical portion and an inner end of the annular portion in the radial direction, and projects in the axial direction is provided on the annular portion on a side of the cylindrical portion in the axial direction.

A requirement of the above "surface of the annular portion on a side opposite to the cylindrical portion in the axial direction is a substantially flat surface" is satisfied even in a case where the surface of the annular portion on the side opposite to the cylindrical portion in the axial direction has at least one of one or more minute recesses and one or more minute projections that do not hinder process mobility at the time of battery assembly (do not deteriorate workability of a battery assembly process). Additionally, a recess having a depth of 1 mm or less is included in the minute recess, and a projection having a height of 1 mm or less is included in the minute projection. Therefore, even when the recess having a depth of 1 mm or less, and the projection having a height of 1 mm or less exists on the surface of the annular portion on the side opposite to the cylindrical portion in the axial direction, the requirement of the "substantially flat surface" is satisfied.

A cylindrical battery according to the present disclosure comprises: an electrode assembly in which a positive electrode and a negative electrode are wound via a separator; an electrolyte; a bottomed cylindrical exterior can that houses the electrode assembly and the electrolyte; a sealing assembly; and an annular gasket interposed between the exterior can and the sealing assembly, wherein the exterior can has an annular groove that extends in a circumferential direction on an outer circumferential surface, and projects to the inward side in the radial direction, and a projecting portion that projects to the inward side in the radial direction of the annular groove, the gasket includes a covering portion that covers at least a part of an inner side portion of the projecting portion in the radial direction, and a support portion that supports a surface of the sealing assembly on a side of a bottom of the exterior can in an axial direction, the covering portion inclines so as to go inward in the radial direction toward the bottom in the axial direction, and the support portion includes a projection having a tip in contact with the sealing assembly.

Advantageous Effect of Invention

According to the gasket and the cylindrical battery of the present disclosure, it is possible to suppress a short circuit of the lead portion, and improve workability at the time of assembly.

DESCRIPTION OF EMBODIMENTS

Figure 1:
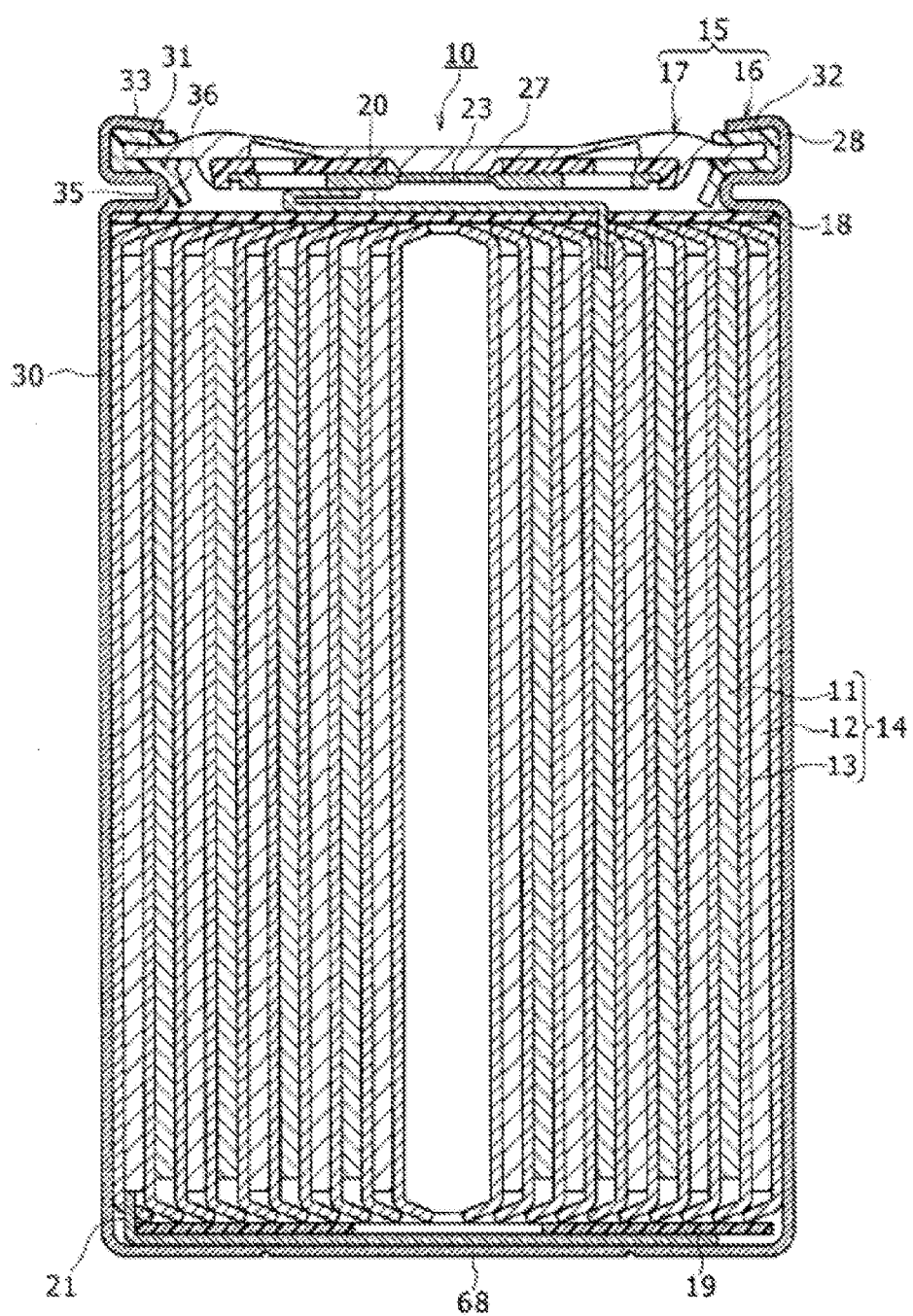
FIG. 1 is an axial sectional view of a cylindrical battery according to an embodiment of the present disclosure.

Hereinafter, an embodiment of a cylindrical battery according to the present disclosure will be described in detail with reference to the drawings. The cylindrical battery of the present disclosure may be a primary battery, or may be a secondary battery. Additionally, the cylindrical battery may be a battery using an aqueous electrolyte, or may be a battery using a non-aqueous electrolyte. In the following, a non-aqueous electrolyte secondary battery (lithium ion battery) using a non-aqueous electrolyte will be exemplified as a cylindrical battery 10 of the embodiment. However, the cylindrical battery of the present disclosure is not limited to this.

In a case where a plurality of embodiments and modifications and the like are included in the following, it is assumed from the beginning that a new embodiment is constructed by appropriately combining those feature portions. In the following embodiments, the same components are denoted by the same reference numerals in the drawings, and duplicate descriptions are omitted. Schematic diagrams are included in a plurality of the drawings, and the dimensional ratios such as lengths, widths and heights of each member between different drawings are not necessarily the same. In this specification, for convenience of explanation, the direction along the axial direction of a battery case 15 is defined as the height direction, the sealing assembly 17 side in the height direction is "up", and the bottom side of an exterior can 16 in the height direction is defined as "bottom". Of the components described below, components that are not described in the independent claim indicating the highest level concept are arbitrary components, and are not essential components.

Figure 2:
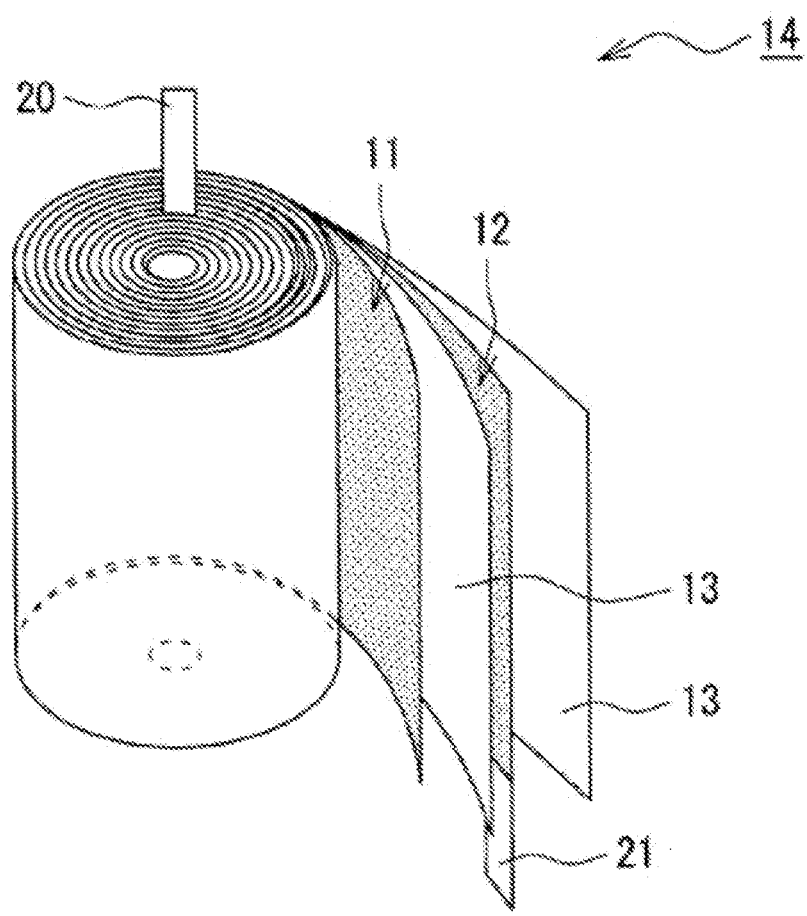
FIG. 2 is a perspective view of an electrode assembly of the cylindrical battery.

FIG. 1 is an axial sectional view of the cylindrical battery 10 according to the embodiment of the present disclosure, and FIG. 2 is a perspective view of an electrode assembly 14 of the cylindrical battery 10. As illustrated in FIG. 1, the cylindrical battery 10 comprises the wound-type electrode assembly 14, a non-aqueous electrolyte (not illustrated), and the battery case 15 that houses the electrode assembly 14 and the non-aqueous electrolyte. As illustrated in FIG. 2, the electrode assembly 14 includes a positive electrode 11, a negative electrode 12, and a separator 13 interposed between the positive electrode 11 and the negative electrode 12, and has a wound structure in which the positive electrode 11 and the negative electrode 12 are wound via the separator 13. Referring to FIG. 1 again, the battery case 15 is composed of the bottomed cylindrical exterior can 16 and the sealing assembly 17 that blocks an opening of the exterior can 16.

The cylindrical battery 10 comprises a resin gasket 28 interposed between the exterior can 16 and the sealing assembly 17.

The non-aqueous electrolyte includes a non-aqueous solvent and an electrolyte salt dissolved in the non-aqueous solvent. For a non-aqueous solvent, for example, esters, ethers, nitriles, amides, and two or more groups of mixed solvents thereof, or the like may be used. The non-aqueous solvent may contain a halogen substitution compound obtained by substituting at least a part of hydrogen of these solvents with a halogen atom such as fluorine. The non-aqueous electrolyte is not limited to a liquid electrolyte, but may be a solid electrolyte using gelatinous polymer, or the like. As the electrolyte salt, a lithium salt such as $LiPF_6$ is used.

As illustrated in FIG. 2, the electrode assembly 14 has the long positive electrode 11, the long negative electrode 12, and the two long separators 13. The electrode assembly 14 has a positive electrode lead 20 joined to the positive electrode 11 and a negative electrode lead 21 joined to the negative electrode 12. The negative electrode 12 is formed to be one size larger than the positive electrode 11 in order to suppress precipitation of lithium, and is formed to be longer in the longitudinal direction and the width direction (short direction) than the positive electrode 11. The two separators 13 are each formed to be at least one size larger than the positive electrode 11, and are each disposed so as to interpose, for example, the positive electrode 11 therebetween.

The positive electrode 11 has a positive electrode current collector and a positive electrode mixture layer formed on both surfaces of the current collector. As the positive electrode current collector, it is possible to use foil of a metal stable in a potential range of the positive electrode 11, such as aluminum and an aluminum alloy, a film including such a metal disposed on a surface layer thereof, or the like. The positive electrode mixture layer includes a positive electrode active material, a conductive agent, and a binder. The positive electrode 11 can be produced by, for example, applying a positive electrode mixture slurry including a positive electrode active material, a conductive agent, a binder, and the like on a positive electrode current collector, drying the applied film, and thereafter compressing and forming a positive electrode mixture layer on both surfaces of the current collector.

The positive electrode active material is composed of a lithium-containing metal composite oxide as a main component. Examples of metal elements contained in the lithium-containing metal composite oxide include Ni, Co, Mn, Al, B, Mg, Ti, V, Cr, Fe, Cu, Zn, Ga, Sr, Zr, Nb, In, Sn, Ta, W and the like. An example of the lithium-containing metal composite oxide is preferably an composite oxide containing at least one of the group consisting of Ni, Co, Mn and Al.

Examples of conductive agents included in the positive electrode mixture layer include carbon powders such as carbon black, acetylene black, Ketjen black, and graphite. As the binder included in the positive electrode mixture layer, fluororesin such as polytetrafluoroethylene (PTFE), and polyvinylidene fluoride (PVdF), and polyacrylonitrile (PAN), polyimide, acrylic resin, polyolefin, and the like can be exemplified. These resins may be used in combination with cellulose derivatives such as carboxymethyl cellulose (CMC) or salts thereof, polyethylene oxide (PEO), or the like.

The negative electrode 12 has a negative electrode current collector, and a negative electrode mixture layer formed on both surfaces of the current collector. As the negative electrode current collector, it is possible to use foil of a metal stable in a potential range of the negative electrode 12, such as copper and a copper alloy, a film including such a metal disposed on a surface layer thereof, or the like. The negative electrode mixture layer includes a negative electrode active material, and a binder. The negative electrode 12 can be produced by, for example, applying a negative electrode mixture slurry including a negative electrode active material, a binder, and the like on a negative electrode current collector, drying the applied film, and thereafter compressing and forming a negative electrode mixture layer on both surfaces of the current collector.

As the negative electrode active material, a carbon material that reversibly occludes and releases lithium ions is generally used. A preferable carbon material is graphite such as natural graphite such as flaky graphite, lump graphite and earthy graphite, and artificial graphite such as lump artificial graphite and graphited mesophase carbon microbeads. The negative electrode mixture layer may include an Si-containing compound as the negative electrode active material. As the negative electrode active material, a metal alloyed with lithium other than Si, an alloy containing such a metal, a compound containing such a metal, and the like may be used.

As the binder included in the negative electrode mixture layer, fluororesin, PAN, polyimide resin, acrylic resin, polyolefin resin, or the like may be used like the case of the positive electrode 11, and a styrene-butadiene rubber (SBR) or a modification thereof is preferably used. As the negative electrode mixture layer, for example, in addition to SBR and the like, CMC or the salts thereof, polyacrylic acid (PAA) or the salts thereof, polyvinyl alcohol, or the like may be included.

As each separator 13, a porous sheet having ion permeability and insulation is used. Specific examples of the porous sheet include microporous thin films, woven fabric, and non-woven fabric. As a material for the separator 13, olefin resins such as polyethylene and polypropylene, cellulose, or the like is preferable. The separator 13 may be either a single layer structure or a laminated structure. A heat-resistant layer or the like may be formed on a surface of the separator 13. The negative electrode 12 may compose a winding start end of the electrode assembly 14, but the separator 13 generally extends beyond a winding start side end of the negative electrode 12, and a winding start side end of the separator 13 becomes a winding start end of the electrode assembly 14.

In the example illustrated in FIG. 1 and FIG. 2, the positive electrode lead 20 is electrically connected to an intermediate portion such as a central portion in the winding direction of a positive electrode current collector, and the negative electrode lead 21 is electrically connected to a winding finish end in the winding direction of a negative electrode current collector. However, the negative electrode lead may be electrically connected to a winding start end in the winding direction of the negative electrode current collector. Alternatively, the electrode assembly has two negative electrode leads, one of the negative electrode lead is electrically connected to the winding start end in the winding direction of the negative electrode current collector, and the other negative electrode lead may be electrically connected to a winding finish end in the winding direction of the negative electrode current collector. Alternatively, a side end on the winding finish side in the winding direction of the negative electrode current collector is brought into contact with an inner surface of the exterior can, so that the negative electrode and the exterior can may be electrically connected.

As illustrated in FIG. 1, the cylindrical battery 10 further has an insulating plate 18 disposed on the upper side of the electrode assembly 14, and an insulating plate 19 disposed on the lower side of the electrode assembly 14. In the example illustrated in FIG. 1, the positive electrode lead 20 attached to the positive electrode 11 extends toward the sealing assembly 17 through a through hole of the insulating plate 18, and the negative electrode lead 21 attached to the negative electrode 12 passes through the outside of the insulating plate 19 to extend toward a bottom 68 of the exterior can 16. The positive electrode lead 20 is connected to a lower surface of a terminal plate 23, which is a bottom plate of the sealing assembly 17, by means of welding or the like, and a vent member 27, which is a top plate of the sealing assembly 17 electrically connected to the terminal plate 23, serves as the positive electrode terminal. The negative electrode lead 21 is connected to an inner surface of the bottom 68 of the exterior can 16 by means of welding or the like, and the exterior can 16 serves as the negative electrode terminal.

The exterior can 16 is a metal container having a bottomed cylindrical portion. A portion between the exterior can 16 and the sealing assembly 17 is sealed by the annular gasket 28, and an internal space of the battery case 15 is closed by the sealing. Thus, the gasket 28 has a role of a seal material for maintaining the airtightness of the inside of the battery. The gasket 28 includes a holding portion 32 held by the exterior can 16 and the sealing assembly 17, and insulates the sealing assembly 17 from the exterior can 16. Thus, the gasket 28 also has a role as an insulating material for preventing a short circuit between the exterior can 16 and the sealing assembly 17

The exterior can 16 has a projecting portion 36 that projects to the radially inward side on the inner circumferential side by providing an annular groove 35 in one part in the height direction of a cylindrical outer circumferential surface of the exterior can 16. The annular groove 35 can be framed by, for example, recessing the one part of the cylindrical outer circumferential surface to the radially inward side by spinning radially inward. The exterior can 16 has a bottomed cylindrical portion 30 including the projecting portion 36, and an annular shoulder portion 33. The bottomed cylindrical portion 30 houses the electrode assembly 14 and the non-aqueous electrolyte, and the shoulder portion 33 is bent to the radially inward side from an end of the bottomed cylindrical portion 30 on the opening side to extend inward in the radial direction. The shoulder portion 33 is formed when an upper end of the exterior can 16 is bent to the inner side to be caulked to a circumferential edge 31 of the sealing assembly 17. The sealing assembly 17 is fixed to the exterior can 16 though the gasket 28 by the shoulder portion 33 and the upper side of the projecting portion 36 by the caulking.

Figure 3:
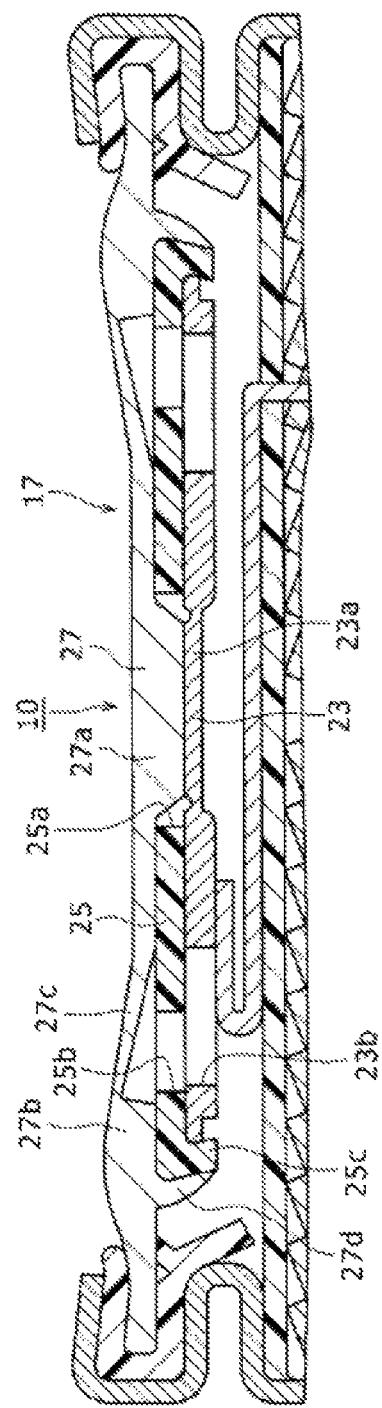
FIG. 3 is an enlarged sectional view of a sealing assembly peripheral portion of the cylindrical battery.

Now, the sealing assembly 17 will be described. FIG. 3 is an enlarged sectional view of a sealing assembly peripheral portion of the cylindrical battery 10. As illustrated in FIG. 3, the sealing assembly 17 has a structure in which the terminal plate 23, an annular insulating plate 25, and the vent member 27 are laminated in this order from the electrode assembly 14 side. The vent member 27 has a circular shape in plan view. The vent member 27 can be produced by, for example, pressing a plate material of aluminum or an aluminum alloy.

The aluminum and the aluminum alloy are excellent in flexibility, and therefore is preferably as a material of the vent member 27.

The vent member 27 has a circular shape in plan view, and a thin wall portion 27c is formed in an intermediate portion connecting a central portion 27a and an outer circumferential portion 27b. When battery internal pressure rises, the thin wall portion 27c reverses and breaks, so that the vent member 27 functions as an explosion-proof valve. The central portion 27a is formed so as to project toward the terminal plate 23, so that connection between the vent member 27 and the terminal plate 23 is facilitated.

The insulating plate 25 is formed in an annular shape in plan view, and has a through hole 25a in the center. The insulating plate 25 is fitted and fixed to a projection 27d formed so as to project downward in the outer circumferential portion 27b of the vent member 27. The insulating plate 25 is provided so as to ensure an insulation property, and is preferably composed of a material that does not affect a battery characteristic. As the material of the insulating plate 25, polymer resin is included, and polypropylene (PP) resin and polybutylene terephthalate (PBT) resin can be exemplified. The insulating plate 25 has a vent hole 25b penetrating the insulating plate in the height direction on the outer circumferential side. The insulating plate 25 has an annular skirt portion 25c extending downward on an outer circumferential edge.

The terminal plate 23 has a circular outer shape with a diameter smaller than that of the insulating plate 25 in plan view, and a central portion 23a is a thin portion. The terminal plate 23 is disposed so as to face the vent member 27 with the insulating plate 25 interposed between the terminal plate 23 and the vent member 27. The terminal plate 23 is attached to the insulating plate 25 by fitting an outer circumferential surface of the terminal plate 23 into an inner circumferential surface of the skirt portion 25c of the insulating plate 25 and fixing the terminal plate 23. The center of the vent member 27 and the center of the terminal plate 23 are connected to each other through the through hole 25a of the insulating plate 25.

The terminal plate 23 is preferably formed from aluminum or an aluminum alloy like the vent member 27, so that the connection between the central portion of the vent member 27 and the central portion of the terminal plate 23 can be easily performed. As the connecting method, metallurgical joint is preferably used, and laser welding is exemplified as the metallurgical joint. A vent hole 23b that penetrates the terminal plate 23 in the height direction is formed on the outer circumferential side of the terminal plate 23. The vent hole 23b communicates with the vent hole 25b of the insulating plate 25. As illustrated in FIG. 3, the inner circumferential surface of the skirt portion 25c may have a conical trapezoidal shape having an inner diameter that decreases toward the lower side. Alternatively, the outer circumferential surface of the terminal plate 23 may have a conical trapezoidal shape corresponding to the inner circumferential surface thereof. In such a case, the terminal plate 23 is press-fitted and fixed to the skirt portion 25c, so that it is possible to reliably prevent positional shift of the terminal plate 23 to the vent member 27.

Figure 4:
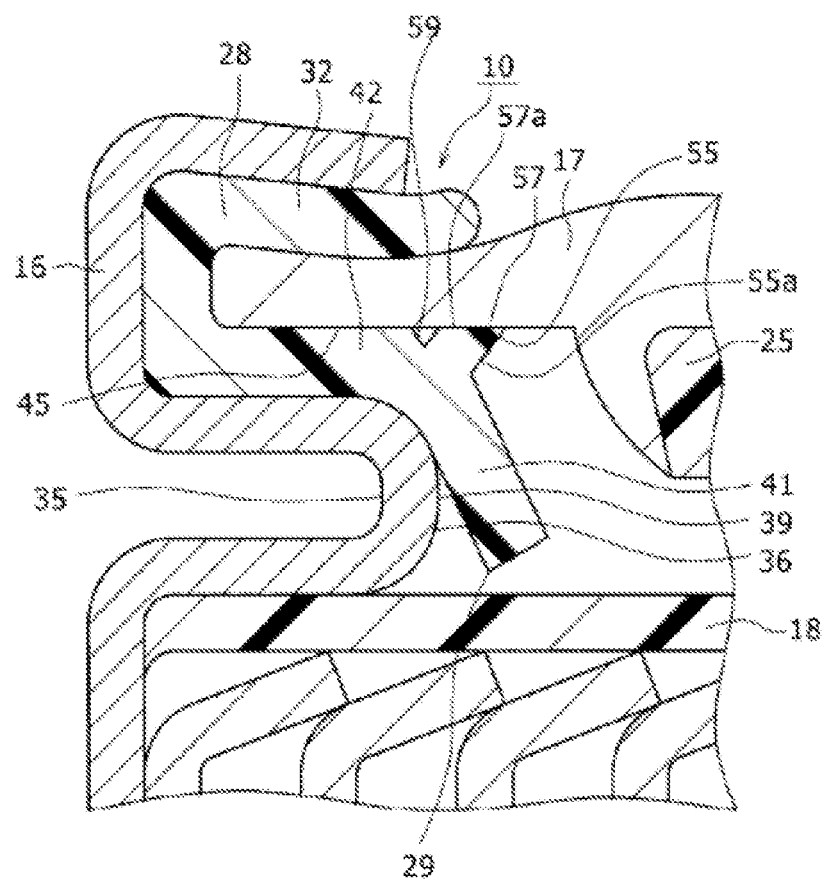
FIG. 4 is an enlarged sectional view of a peripheral portion of an annular groove of an exterior can in FIG. 1.

Now, a short circuit prevention structure of the positive electrode lead 20 in the gasket 28 and a support structure of the sealing assembly 17 will be described. FIG. 4 is an enlarged sectional view of a peripheral portion of the annular groove 35 of the exterior can 16 in FIG. 1. As illustrated in FIG. 4, the gasket 28 includes a covering portion 41 in addition to the above holding portion 32. The covering portion 41 inclines so as to go radially inward toward the lower side in the height direction from a lower end of the holding portion 32. The covering portion 41 covers at least a part of a radially inner side portion of the projecting portion 36. The covering portion 41 extends from an upper end of the projecting portion 36 to a portion located below a minimum inner diameter portion 39 having the smallest inner diameter in the projecting portion 36. Consequently, the positive electrode lead 20 (see FIG. 1) can be reliably prevented from being short-circuited to the projecting portion 36.

The gasket 28 includes a support portion 42 that supports a lower surface 45 on the lower side in the height direction of the sealing assembly 17 (surface on the bottom 68 (see FIG. 1) side of the exterior can 16 in the height direction). At least a part of the support portion 42 is included in the holding portion 32. An inner circumferential surface 55 of the support portion 42 on the radially inward side includes an inclined surface portion 55a that goes radially outward toward the lower side in the height direction. The support portion 42 has a projection 57 having tip 57a in contact with the lower surface 45 of the sealing assembly 17, and a recess 59 exists on the radially outer side of the projection 57 between the support portion 42 and the lower surface 45 of the sealing assembly 17. The inner circumferential surface 55 of the support portion 42 has the inclined surface portion 55a, so that it is possible to increase the support area of the sealing assembly 17 in the support portion 42, and the support portion 42 can be reliably supported by the gasket 28. As illustrated in FIG. 4, a lower end 29 of the gasket 28 is preferably located at an interval in the height direction with respect to the insulating plate 18, and a distance in the height direction between the lower end 29 of the gasket 28 and the insulating plate 18 is preferably 1 mm or more.

Figure 5:
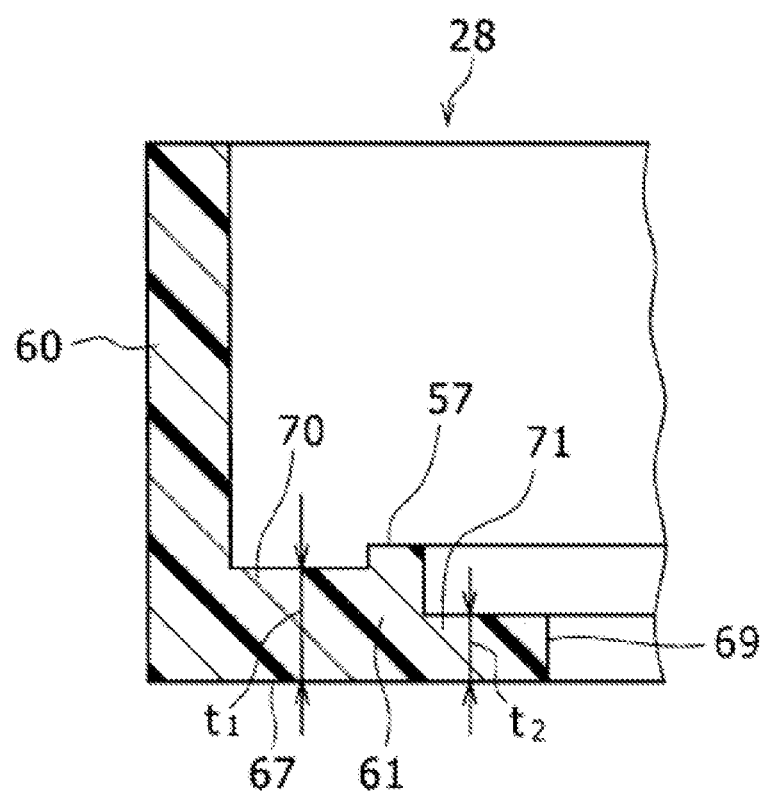
FIG. 5 is a sectional view of a one-side portion located on the one side off a central axis in an annular gasket before mounted on the exterior can.

Now, a method of forming the gasket 28 having the above structure in the exterior can 16 of the cylindrical battery 10 will be described. FIG. 5 is a sectional view of one-side portion located on one side of a central axis in the annular gasket 28 before built-in to exterior can 16. First, the structure of the gasket 28 before built-in to the exterior can 16 will be explained using FIG. 5.

As illustrated in FIG. 5, the gasket 28 comprises a cylindrical portion 60 and an annular portion 61, and the annular portion 61 extends inward in the radial direction from an end of the cylindrical portion 60 in the axial direction. A surface 67 of the annular portion 61 on a side opposite to the cylindrical portion 60 in the axial direction is a substantially flat surface. The projection 57 that is disposed at an interval in the radial direction from each of the cylindrical portion 60 and a radially inner end 69 of the annular portion 61, and projects in the axial direction is provided on the annular portion on a side of the cylindrical portion 60 in the axial direction. Furthermore, the axial thickness t1 of an outward portion 70 of the annular portion 61 located on the radially outward side with respect to the projection 57 is larger than the axial thickness t2 of an inward portion 71 of the annular portion 61 located on the radially inward side with respect to the projection 57. Of course, the thickness t1 in the axial direction of the outward portion 70 of the annular portion 61 located on the radially outward side with respect to the projection 57 and the axial thickness 12 of the inward portion 71 of the annular portion 61 located on the radially inward side with respect to the projection 57 may satisfy relation of t1≤t2.

Figure 6:
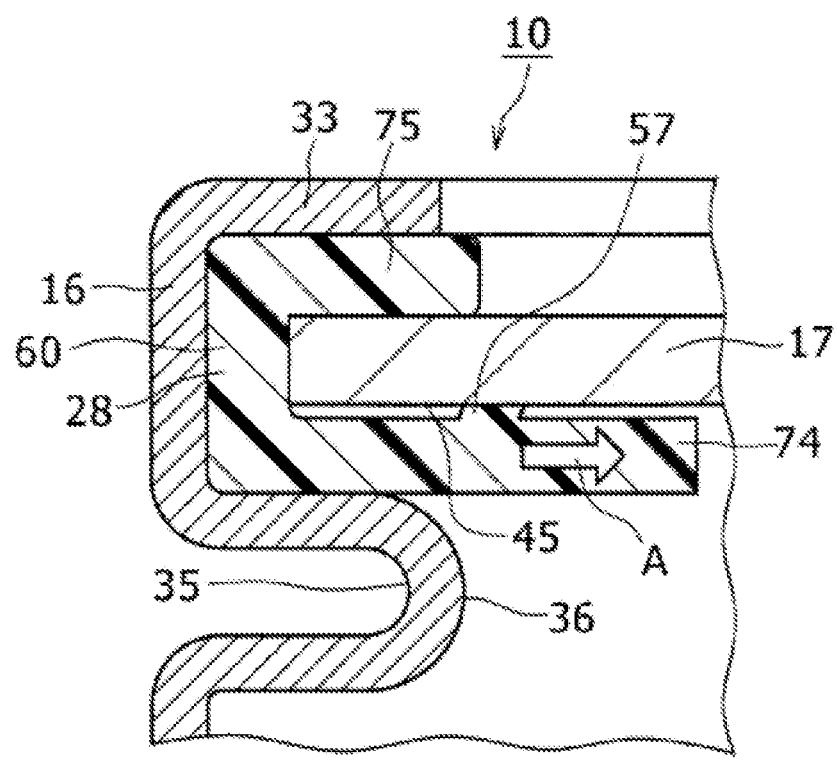
FIG. 6 is a diagram illustrating the built-in operation of the gasket into the exterior can.
Figure 7:
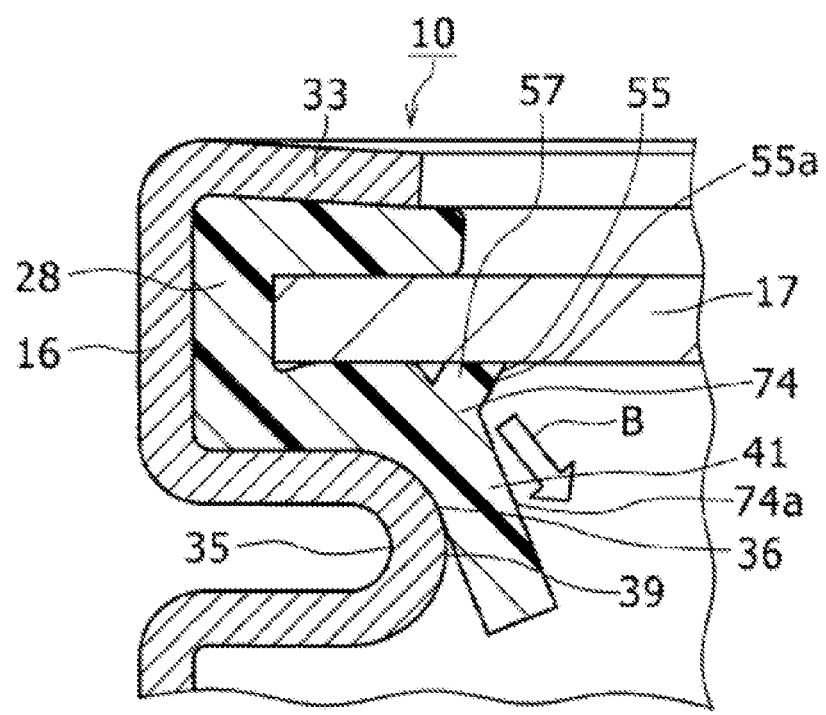
FIG. 7 is a diagram illustrating the built-in operation of the gasket into the exterior can.
Figure 8:
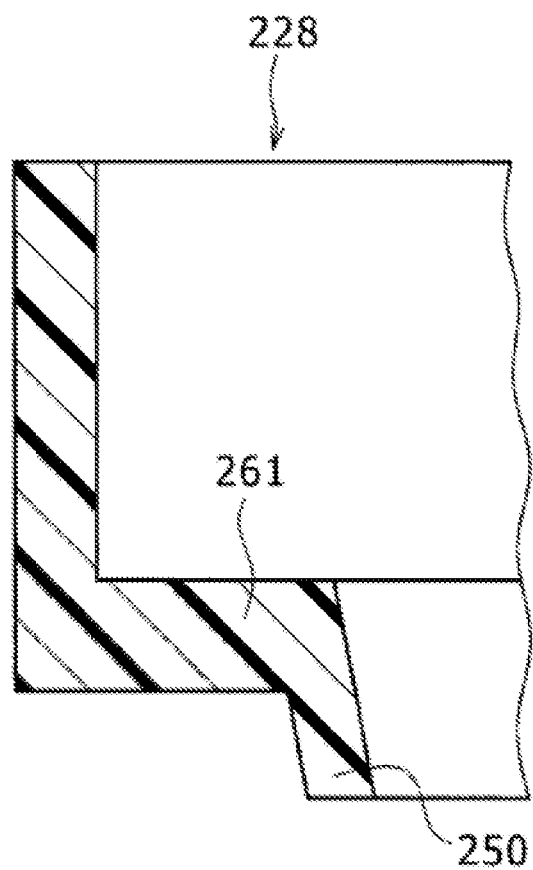
FIG. 8 is a sectional view of a gasket of a reference example corresponding to FIG. 5.

Now, the built-in operation (fitting operation) of the gasket 28 into the exterior can 16 will be described. FIG. 6 and FIG. 7 are each an enlarged sectional view in the axial direction of a part of the cylindrical battery 10 illustrating a state of the gasket 28 during the operation. FIG. 8 is an enlarged sectional view of a gasket 228 of a reference example corresponding to FIG. 5.

When the cylindrical battery 10 is assembled, the gasket 28 is first preferably fitted and fixed on the radially outer side of the sealing assembly 17. Thus, for comparison with a case where the gasket 28 and the sealing assembly 17 are mutually independently fitted to the exterior can 16, fitting work to the exterior can 16 can be completed only once, and the sealing assembly 17 is covered with the gasket 28, so that it is possible to reliably prevent a short circuit between the sealing assembly 17 and the exterior can 16. Thereafter, the positive electrode lead 20 (see FIG. 1) extending from the electrode assembly 14 is electrically connected to a lower surface of the sealing assembly 17 by welding. In the gasket 28 of this embodiment, the annular portion 61 has the surface 67 on the lower side that is a substantially flat surface. Therefore, in a comparison with the gasket 228 of the reference example illustrated in FIG. 8, that is, the gasket 228 in which an annular portion 261 has, on the radially inward end, an annular flange portion 250 projecting downward in the height direction, the lower side of the sealing assembly 17 is not covered with the flange portion 250, and it is possible to smoothly perform welding of a positive electrode lead 20 to the sealing assembly 17. The sealing assembly 17 may be fitted to the gasket 28 fitted to the exterior can 16 in advance after the positive electrode lead 20 is welded to the sealing assembly 17.

Next, the gasket 28 in which the electrode assembly 14 and the sealing assembly 17 are integrated is fitted into an inner circumferential surface of the exterior can 16 before caulking, and thereafter, an upper end portion of the exterior can 16 is deformed in the radially inward side so as to form the shoulder portion 33. Then, as illustrated in FIG. 6, an upper side 75 of the cylindrical portion 60 of the gasket 28 is bent to the radially inward side, and the gasket 28 is compressed in the axial direction (height direction). As a result, in the gasket 28, a lower portion 74 located on the lower side with respect to the lower surface 45 of the sealing assembly 17 is stretched in the radially inward side illustrated by the arrow A.

Thereafter, the caulking of the exterior can 16 further progresses. When the shoulder portion 33 is deformed downward as illustrated in, FIG. 7, the lower portion 74 is further compressed in the height direction, so that the projection 57 deforms so as to go radially inward toward the upper side in the height direction. At this time, the inclined surface portion 55a is formed on the inner circumferential surface 55 on the radially inward side of the projection 57.

An inward portion 74a of the lower portion 74 located on the radially inward side with respect to the projection 57 is deformed diagonally downward as illustrated by the arrow B with the projection 57 as a starting point by downward force from the sealing assembly 17 received by the projection 57. As a result, as to the height direction, the radially inner side of the projecting portion 36 is covered from the upper end of the projecting portion 36 to a portion located on the lower side with respect to the minimum inner diameter portion 39 having the smallest inner diameter in the projecting portion 36 with the covering portion 41 formed by bending the inward portion 74a.

As described above, in the gasket 28 of the present disclosure, in a state before fitted into the exterior can 16, the surface 67 of the annular portion 61 on a side opposite to the cylindrical portion 60 in the axial direction is the substantially flat surface. The projection 57 that projects in the axial direction at the radially interval from each of the cylindrical portion 60 and the inner end 69 of the of the annular portion 61 is provided on the cylindrical portion 60 side of the annular portion 61.

Therefore, the surface 67 of the annular portion 61 on a side opposite to the cylindrical portion 60 in the axial direction is the substantially flat surface, and therefore even when the gasket 28 is fixed to the sealing assembly 17, the welding of the positive electrode lead 20 to the sealing assembly 17 can be easily performed.

The surface 67 of the annular portion 61 on a side opposite to the cylindrical portion 60 in the axial direction is the substantially flat surface, and therefore the surface 67 on the lower side of the annular portion 61 is not caught by other member or portion dining handling of the gasket 28, work related to the gasket 28 can be smoothly performed.

Furthermore, the above projection 57 exists on the gasket 28, and therefore the tip side of the annular portion 61 of the gasket 28 can be easily deformed diagonally downward with the projection 57 as the starting point only by caulking of the exterior can 16 when the gasket 28 integrated with the sealing assembly 17 is fitted into the exterior can 16. Accordingly, the covering portion 41 that covers the radially inner side of at least a part of the projecting portion 36 of the exterior can 16 can be easily formed.

Accordingly, it is possible to reliably prevent the short circuit of the positive electrode lead 20 and the exterior can 16, and remarkably improve workability (process mobility) at the time of assembly of the cylindrical battery 10.

The thickness t1 in the front direction of an outward portion 70 of the annular portion 61 located on the radially outward side with respect to the projection 57 may be larger than the axial thickness t2 of an inward portion 71 of the annular portion 61 located on the radially inward side with respect to the projection 57.

According to the aforementioned configuration, it is possible to reduce the rigidity of the inward portion 71 that deforms when the gasket 28 is built in the exterior can 16. Therefore, the inward portion 71 can be reliably bent diagonally downward when the gasket 28 is built in the exterior can 16, and at least a part of the projecting portion 36 can be reliably covered with the covering portion 41 formed by diagonally bending the inward portion 71.

According to the cylindrical battery 10 of the present disclosure, the gasket 28 includes the support portion 42 (see FIG. 4) that supports a surface 45 (see FIG. 4) of the sealing assembly 17 on a side of the bottom 68 (see FIG. 1) of the exterior can 16 in the height direction (axial direction), the inner circumferential surface 55 of the support portion 42 on the radially inward side includes the inclined surface portion 55a that goes radially outward toward the lower side in the height direction.

Therefore, it is possible to increase a region where the support portion 42 supports the surface 45 on the lower side of the sealing assembly 17, and stably support the sealing assembly 17.

The support portion 42 may have the projection 57 having the tip 57a in contact with the sealing assembly 17.

According to the aforementioned configuration, the covering portion 41 can be reliably directed downward by force from the sealing assembly 17 received by projection 57 with the projection 57 as the starting point. Accordingly, it is possible to reliably guard the positive electrode lead 20 from the projecting portion 36, and reliably prevent the short circuit of the positive electrode lead 20 to the projecting portion 36.

The covering portion 41 may cover the radially inner side of the minimum inner diameter portion 39 of the projecting portion 36 having the smallest inner diameter in the projecting portion 36.

According to the aforementioned configuration, a portion closest to the center in the projecting portion 36 is covered with the gasket 28. Therefore, it is possible to reliably prevent the short circuit of the positive electrode lead 20.

The present disclosure is not limited to the above embodiment and modification, and various improvements and changes are possible within the matters described in the claims of the present application and the equivalent scope thereof.

For example, as to the gasket that is not yet fitted in the exterior can, the axial thickness of the outward portion of the annular portion located on the radially outward side with respect to the projection may have a length not more than the axial thickness of the inward portion of the annular portion located on the radially inward side with respect to the projection.

Figure 9:
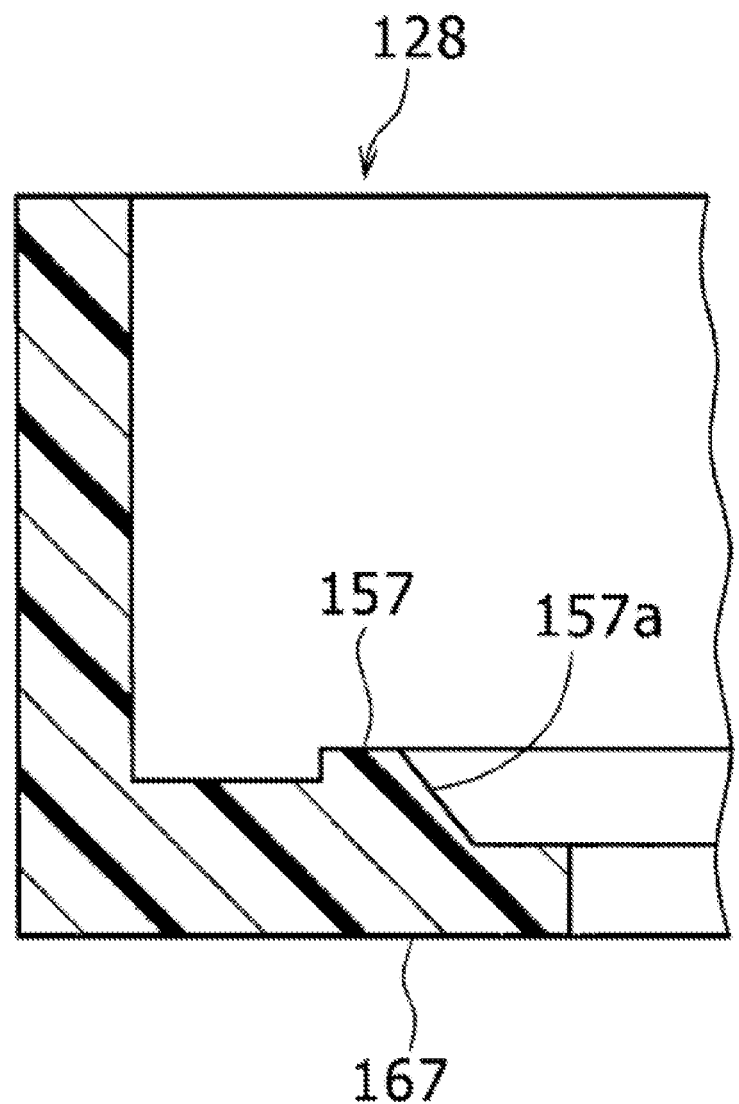
FIG. 9 is a sectional view of a gasket of a modification corresponding to FIG. 5.

As illustrated in FIG. 5, the case where the gasket 28 have the substantially rectangular projection 57 in the axial cross-section is described. However, as illustrated in FIG. 9, that is, a sectional view corresponding to FIG. 5 of a gasket 128 of a modification, an inner circumferential surface 157a of a projection 157 on the radially inner side may be a tapered surface or the like that goes radially inward toward a substantially flat surface 167 in the axial direction.

In short, the gasket of the present disclosure may have any structure as long as the gasket comprises: a cylindrical portion; and an annular portion that extends inward in a radial direction from one end of the cylindrical portion in the axial direction, wherein a surface of the annular portion on a side opposite to the cylindrical portion in the axial direction is a substantially flat surface, and a projection that is disposed at an interval in the radial direction from each of the cylindrical portion and an inner end of the annular portion in the radial direction, and projects in the axial direction is provided on the annular portion on a side of the cylindrical portion in the axial direction.

As to the cylindrical battery 10, the case where the covering portion 41 covers the radially inner side of the minimum inner diameter portion 39 of the projecting portion 36 having the smallest inner diameter in the projecting portion 36 is described. However, the covering portion may not cover the radially inner side of the minimum inner diameter portion having the smallest inner diameter in the projecting portion.

It is assumed that the gasket used for the cylindrical battery comprises the following configuration. That is, the gasket has a cylindrical portion, and an annular portion that extends inward in a radial direction from one end of the cylindrical portion in the axial direction. A projection that is disposed at an interval in radial direction from each of the cylindrical portion and an inner end of the annular portion in the radial direction, and projects in the axial direction is provided on the annular portion on a side of the cylindrical portion in the axial direction in the annular portion. Additionally, an axial thickness of an outward portion of the annular portion located on a radially outward side with respect to the projection, is larger than an axial thickness of an inward portion of the annular portion located on a radially inward side with respect to the projection.

In the gasket comprising the above configuration, the thickness of the above outward portion is larger than the thickness of the inward portion, and therefore the rigidity of the inward portion is smaller than the rigidity of the outward portion. Therefore, in the gasket comprising such a configuration, even when the surface of the annular portion on the side opposite to the cylindrical portion in the axial direction is not the substantially flat surface, and has at least one of one or more recesses and one or more projections that deteriorates process mobility (handling property) at the time of battery assembly, the inward portion is easily bent to the lower side with the projection as the starting point when the gasket is fitted in the exterior can. Accordingly, at least a part of the projecting portion is easily covered with the covering portion formed by bending the inward portion.

REFERENCE SIGNS LIST 10 cylindrical battery, 11 positive electrode, 12 negative electrode, 13 separator, 14 electrode assembly, 16 exterior can, 17 sealing assembly, 28, 128 gasket, 32 holding portion of gasket, 35 annular groove, 36 projecting portion, 39 minimum inner diameter portion, 41 covering portion, 42 support portion, 45 surface of sealing assembly on a side of bottom surface of exterior can in axial direction, 55 inner circumferential surface of support portion, 55a inclined surface portion, 57, 157 projection, 57a tip of projection, 60 cylindrical portion, 61 annular portion, 67,167 surface of annular portion on side opposite to cylindrical portion in axial direction, 68 bottom of exterior can, 69 radially inner end of annular portion, 70 outward portion, 71 inward portion, t1 thickness of outward portion in axial direction, t2 thickness of inward portion in axial direction

The invention claimed is:

1. A gasket of a cylindrical battery comprising:
a cylindrical portion; and
an annular portion that extends inward in a radial direction from one end of the cylindrical portion in the axial direction, wherein
a surface of the annular portion on a side opposite to the cylindrical portion in the axial direction is a substantially flat surface,
a projection that is disposed at an interval in the radial direction from each of the cylindrical portion and an inner end of the annular portion in the radial direction, and projects in the axial direction is provided on the annular portion on a side of the cylindrical portion in the axial direction, and
a thickness of an outward portion of the annular portion in the axial direction, the outward portion being located on an outward side in the radial direction with respect to the projection, is larger than a thickness of an inward portion of the annular portion in the axial direction, the inward portion being located on an inward side in the radial direction with respect to the projection.

2. A cylindrical battery comprising:
an electrode assembly in which a positive electrode and a negative electrode are wound via a separator;
an electrolyte;
a bottomed cylindrical exterior can that houses the electrode assembly and the electrolyte;
a sealing assembly; and
an annular gasket interposed between the exterior can and the sealing assembly, wherein
the exterior can has an annular groove that extends in a circumferential direction on an outer circumferential surface, and projects to the inward side in the radial direction, and a projecting portion that projects to the inward side in the radial direction of the annular groove, the gasket includes a covering portion that covers at least a part of an inner side portion of the projecting portion in the radial direction, and a support portion that supports a surface of the sealing assembly on a side of a bottom of the exterior can in an axial direction, the covering portion inclines so as to go inward in the radial direction toward the bottom in the axial direction, the support portion includes a projection having a tip in contact with the sealing assembly, and an entire section of an annular portion of the gasket that is radially inside of the projection is inclined away from the surface of the sealing assembly.

3. The cylindrical battery according to claim 2, wherein an inner circumferential surface of the projection on the inward side in the radial direction has an inclined surface portion that goes outward in the radial direction toward the bottom in the axial direction.

4. The cylindrical battery according to claim 2, wherein the covering portion covers an inner side in the radial direction of a minimum inner diameter portion of the projecting portion having the smallest inner diameter in the projecting portion.

5. A cylindrical battery comprising:

an electrode assembly in which a positive electrode and a negative electrode are wound via a separator;

an electrolyte;

a bottomed cylindrical exterior can that houses the electrode assembly and the electrolyte;

a sealing assembly; and an annular gasket interposed between the exterior can and the sealing assembly, wherein the exterior can has an annular groove that extends in a circumferential direction on an outer circumferential surface, and projects to the inward side in the radial direction, and a projecting portion that projects to the inward side in the radial direction of the annular groove, the gasket includes a covering portion that covers at least a part of an inner side portion of the projecting portion in the radial direction, and a support portion that supports a surface of the sealing assembly on a side of a bottom of the exterior can in an axial direction, the covering portion inclines so as to go inward in the radial direction toward the bottom in the axial direction, the support portion includes a projection having a tip in contact with the sealing assembly, and an inner circumferential surface of the projection on the inward side in the radial direction has an inclined surface portion that goes outward in the radial direction toward the bottom in the axial direction.

6. The cylindrical battery according to claim 5, wherein the covering portion covers an inner side in the radial direction of a minimum inner diameter portion of the projecting portion having the smallest inner diameter in the projecting portion.

* * * * *